(12) United States Patent
Cho

(10) Patent No.: US 9,535,199 B2
(45) Date of Patent: Jan. 3, 2017

(54) POLARIZATION FILM AND DISPLAY DEVICE

(71) Applicant: SAMSUNG DISPLAY CO., LTD., Yongin, Gyeonggi-do (KR)

(72) Inventor: Jong-Hwan Cho, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 212 days.

(21) Appl. No.: 13/791,882

(22) Filed: Mar. 8, 2013

(65) Prior Publication Data

US 2013/0335824 A1 Dec. 19, 2013

(30) Foreign Application Priority Data

Jun. 18, 2012 (KR) .................. 10-2012-0065042

(51) Int. Cl.
G02B 5/30 (2006.01)
(52) U.S. Cl.
CPC ........... *G02B 5/3025* (2013.01); *G02B 5/3033* (2013.01)
(58) Field of Classification Search
CPC ..... G02B 6/126; G02B 5/3025; G02B 5/3033; C09J 133/14; G02F 1/1303
USPC .......... 359/483.01, 485.01, 485.03, 485.05, 359/487.01, 487.03, 489.01, 489.06, 489.08, 359/489.11, 492.2, 492.01; 362/19; 353/20; 349/96
See application file for complete search history.

(56) References Cited

U.S. PATENT DOCUMENTS

| | | | |
|---|---|---|---|
| 6,882,474 B2* | 4/2005 | Umemoto et al. ........ | 359/485.03 |
| 7,136,217 B2* | 11/2006 | Kawakami et al. .......... | 359/321 |
| 7,753,543 B2* | 7/2010 | Hsu ........................ | G02B 5/045 362/620 |
| 2007/0244255 A1* | 10/2007 | Wang et al. ................... | 525/100 |
| 2010/0091281 A1* | 4/2010 | Suzuki ......................... | 356/364 |
| 2012/0242222 A1 | 9/2012 | Jung et al. | |

FOREIGN PATENT DOCUMENTS

| | | |
|---|---|---|
| JP | 2003177398 A * | 6/2003 |
| JP | 2004-020634 | 1/2004 |
| JP | 2008-180765 | 8/2008 |
| JP | 2011-123475 | 6/2011 |
| KR | 10-2012-0109081 | 10/2012 |

OTHER PUBLICATIONS

Chiyoaki Iijima, "Liquid Crystal Display Device and Electronic Appliance", JP2003-177398A, machine translation.*

* cited by examiner

*Primary Examiner* — Bumsuk Won
*Assistant Examiner* — Wen Huang
(74) *Attorney, Agent, or Firm* — Lewis Roca Rothgerber Christie LLP

(57) ABSTRACT

A polarization film including a polarizer polarizing incident light in a polarization direction and having a first polarization groove recessed from an upper surface of the polarizer and extending in a first direction; a first transparent support at the upper surface of the polarizer; and a second transparent support at a lower surface of the polarizer.

6 Claims, 6 Drawing Sheets

<u>1000</u>

(a)

(b)

POLARIZATION FILM AND DISPLAY DEVICE

CROSS-REFERENCE TO RELATED APPLICATION

This application claims priority to and the benefit of Korean Patent Application No. 10-2012-0065042 filed in the Korean Intellectual Property Office on Jun. 18, 2012, the entire contents of which are incorporated herein by reference.

BACKGROUND

1. Field

Aspects of the present invention relate to a polarization film and a display device.

2. Description of the Related Art

A display device is a device for displaying an image. One example of a display device is an organic light emitting diode (OLED) display.

Since the organic light emitting diode (OLED) display has a self-light emitting characteristic so that a separate light source is not required, which is unlike a liquid crystal display (LCD), a thickness and a weight thereof may be reduced.

The organic light emitting diode (OLED) display may include a first substrate, an organic light emitting diode disposed on the first substrate, a second substrate facing the first substrate with the organic light emitting diode interposed therebetween, and a polarization film attached to the second substrate. If the first substrate and the second substrate include a flexible substrate such as a resin, a laminate of the first substrate, the organic light emitting diode, and the second substrate may be implemented to form a flexible display panel that can be bended, folded, or rolled.

However, the polarization film, which may be formed of a polarizer for polarizing incident light and a transparent support attached to the polarizer, may have low flexibility as compared to the flexible display panel. Accordingly, the flexibility of the entire display device to which the polarization film is attached may be deteriorated.

While simply reducing a thickness of the polarizer may improve flexibility, an optical characteristic of the polarizer is likely to be deteriorated.

The above information disclosed in this Background section is only for enhancement of understanding of the background of the described technology and therefore it may contain information that does not form the prior art that is already known in this country to a person of ordinary skill in the art.

SUMMARY

Aspects of the present invention provide for a polarization film and a display device having improved flexibility.

An exemplary embodiment of the present invention provides for a polarization film including: a polarizer configured to polarize incident light in a polarization direction, the polarizer having a first polarization groove recessed from an upper surface of the polarizer and extending in a first direction; a first transparent support at the upper surface of the polarizer; and a second transparent support at a lower surface of the polarizer.

The polarizer may have a plurality of first polarization grooves that include: the first polarization groove extending in the first direction; and another first polarization groove that is recessed from the upper surface of the polarizer and extends in a second direction crossing the first direction.

The polarizer may further have a second polarization groove recessed from the lower surface of the polarizer and extending in the first direction.

The polarizer may have a plurality of second polarization grooves that include: the second polarization groove extending in the first direction; and another second polarization groove that is recessed from the lower surface of the polarizer and extends in a second direction crossing the first direction.

The second polarization groove may not overlap the first polarization groove.

The second polarization groove may overlap the first polarization groove.

The polarizer may include polyvinyl alcohol (PVA).

At least one of the first transparent support or the second transparent support may include triacetyl cellulose (TAC).

Another exemplary embodiment according to the present invention provides for a polarization film including: a polarizer configured to polarize incident light in a polarization direction; a first transparent support at one surface of the polarizer and having a first transparent groove, which is recessed from an upper surface of the first transparent support and extends in a first direction; and a second transparent support at another surface of the polarizer.

The first transparent support may have a plurality of first transparent grooves including: the first transparent groove extending in the first direction; and another first transparent groove that is recessed from the upper surface of the first transparent support and extends in a second direction crossing the first direction.

The first transparent support may further have a second transparent groove, which is recessed from a lower surface of the first transparent support and extends in the first direction.

The first transparent support may have a plurality of second transparent grooves including: the second transparent groove extending in the first direction; and another second transparent groove that is recessed from the lower surface of the first transparent support and extends in a second direction crossing the first direction.

The second transparent groove may not overlap the first transparent groove.

The second transparent groove may overlap the first transparent groove.

Yet another exemplary embodiment of the present invention provides for a display device including: a flexible display panel configured to display an image; and a polarization film on the flexible display panel including: a polarizer configured to polarize incident light in a polarization direction, the polarizer having a first polarization groove recessed from an upper surface of the polarizer and extending in a first direction; a first transparent support at the upper surface of the polarizer; and a second transparent support at a lower surface of the polarizer.

Accordingly, there are provided a polarization film and a display device having improved flexibility.

DETAILED DESCRIPTION

Figure 1:
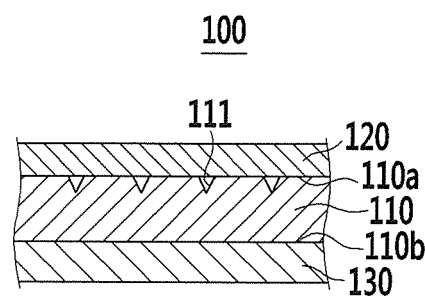
FIG. 1 is a cross-sectional view showing a polarization film according to a first exemplary embodiment.

Hereinafter, the present invention will be described more fully with reference to the accompanying drawings, in which certain exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in several exemplary embodiments, a constituent element having the same (or substantially similar) configuration will be representatively described in a first exemplary embodiment by using the same reference numeral, and other configurations different from those of the first exemplary embodiment will be described in other exemplary embodiments.

In addition, the size and thickness of each component shown in the drawings are arbitrarily shown for understanding and ease of description, thus, the present invention is not limited thereto.

When an element is referred to as being "on" (e.g., disposed or formed on) another element, it may be directly on the another element or be indirectly on the another element with one or more intervening elements interposed therebetween.

In addition, in the specification, unless explicitly described to the contrary, the words "comprise," including variations such as "comprises" or "comprising," and "include," including variations such as "includes" or "including," will be understood to imply the inclusion of stated elements but not the exclusion of any other elements.

Hereinafter, a polarization film according to a first exemplary embodiment will be described with reference to FIGS. 1 to 2.

FIG. 1 is a cross-sectional view showing a polarization film according to a first exemplary embodiment.

As shown in FIG. 1, a polarization film 100 according to the first exemplary embodiment, which polarizes incident light, includes a polarizer 110, a first transparent support 120, and a second transparent support 130.

The polarizer 110 polarizes light that is incident on the polarization film 100. The polarizer 110 may be formed of polyvinyl alcohol (PVA). Furthermore, the polarizer 110 may be formed by stretching the polyvinyl alcohol, which is the polymer material, adsorbing a pigment such as iodine thereon, and performing alignment. In FIG. 1, the polarizer 110 includes a first polarization groove 111 (or a plurality of first polarization grooves 111) formed on an upper surface 110a of the polarizer 110.

The first polarization groove 111 may be recessed from the upper surface 110a of the polarizer 110 and may extend in a first direction.

Figure 2:
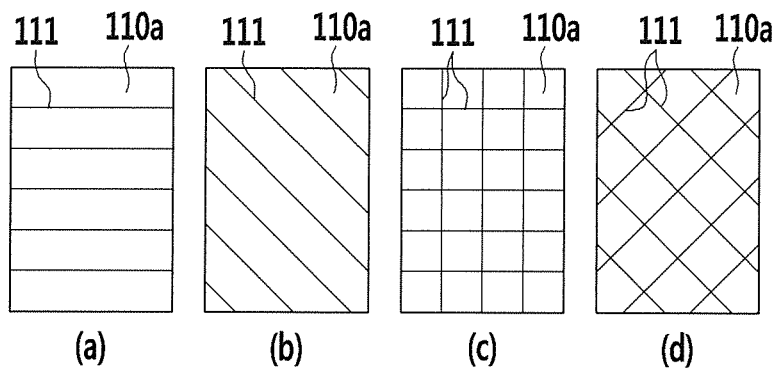
FIG. 2 is a top view of a polarizer shown in FIG. 1.

FIG. 2 is a top view showing of a polarizer shown in FIG. 1. FIGS. 2(a) to 2(d) each show various examples of configuring the first polarization groove 111.

As shown in FIGS. 2(a) and 2(b), the first polarization groove 111 may be recessed from the upper surface 110a of the polarizer 110 and may extend in the first direction. In one embodiment, the depth of the first polarization groove 111 may be from about 0.1 µm to about 10 mm, and the width of the first polarization groove 111 may be from about 0.1 µm to about 100 mm, but the depth and the width are not limited thereto. Herein, the first direction refers to a direction (e.g., a predetermined direction) on the upper surface 110a of the polarizer 110, and the first direction may be a direction that is parallel to a polarization axis of the polarizer 110.

Further, as shown in FIGS. 2(c) and 2(d), the first polarization groove 111 may be recessed from the upper surface 110a of the polarizer 110 and also extend in a second direction crossing the first direction (or, stated another way, another polarization groove 111 (or grooves) of the plurality of polarization grooves 111 may be recessed from the upper surface 110a of the polarizer 110 and extend in a second direction crossing the polarization groove 111 (or grooves) that extend in the first direction). That is, the first polarization groove 111 may be formed in a matrix form. Herein, the second direction refers a direction (e.g., a predetermined direction) crossing the first direction on the upper surface 110a of the polarizer 110.

While, the first polarization groove 111 according to the first exemplary embodiment shown in FIG. 1 has a V-shaped cross-section, the first polarization groove 111 is not limited thereto, and according to other exemplary embodiments, may have a circular, oval, quadrangular, or other suitable cross-section.

Referring back to FIG. 1, the first transparent support 120 is attached to the upper surface 110a of the polarizer 110, and the second transparent support 130 is attached to a lower surface 110b of the polarizer 110. The first transparent support 120 and the second transparent support 130 may serve to protect the first polarization groove 111 while also reinforcing the strength of the entire polarization film 100 by supporting the polarizer 110. One or more embodiments of the first transparent support 120 and the second transparent support 130 according to the present invention may be formed of triacetyl cellulose (TAC).

The polarization film 100 according to the first exemplary embodiment may be manufactured by using a roll to roll process, and when the polarization film 100 is manufactured by using the roll to roll process, the first polarization groove 111 may be formed on the polarizer 110 by using a cutter or a laser.

The polarizer 110 according to the first exemplary embodiment may be formed of PVA, and one or more of the first transparent support 120 and the second transparent support 130 may be formed of TAC, but embodiments of the present invention are not limited thereto; for example, each of the polarizer, the first transparent support, and the second transparent support according to other exemplary embodiments may be formed of a material selected from PET, PMMA, PC and PEN.

Further, in the polarization film according to other exemplary embodiments, a passivation film, an adhesive, and/or a release film may be further attached to each of the first transparent support and the second transparent support.

As described above, in the polarization film 100 according to the first exemplary embodiment, flexibility of the polarizer 110 is improved by including the first polarization groove 111 extending in the first direction in the polarizer 110 or including the first polarization groove 11 extending in the first direction and the second direction in the polarizer 110. Therefore, even though the first transparent support 120 and the second transparent support 130 are attached to the polarizer 110, flexibility of the entire polarization film 100 is improved to allow the polarization film 100 to be capable of being bended, folded, and rolled onto itself. That is, the polarization film 100 having improved flexibility is provided.

Hereinafter, a display device according to a second exemplary embodiment will be described in reference to FIG. 3. The display device according to the second exemplary embodiment is a display device to which the polarization film 100 according to the first exemplary embodiment is attached.

Figure 3:
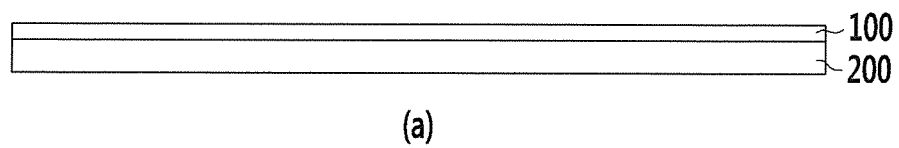
FIG. 3 is a cross-sectional view showing a display device according to a second exemplary embodiment.
Figure 3:
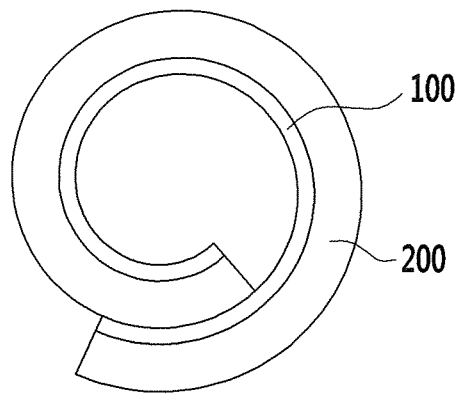

FIG. 3 is a cross-sectional view showing a display device according to a second exemplary embodiment.

As shown in FIG. 3(a), a display device 1000 according to the second exemplary embodiment includes a polarization film 100 and a flexible display panel 200.

The flexible display panel 200 may be an organic light emitting diode (OLED) display where the substrate includes a flexible substrate such as a resin to improve flexibility. Here, the polarization film 100 having improved flexibility is attached to the flexible display panel 200.

As shown in FIG. 3(b), the display device 1000 according to the second exemplary embodiment can be bended, folded, and rolled onto itself if the polarization film 100 having improved flexibility is attached to the flexible display panel 200 to improve flexibility of the entire display device 1000. That is, the display device 1000 having improved flexibility is provided.

Hereinafter, a polarization film according to a third exemplary embodiment will be described with reference to FIGS. 4 and 5.

Hereinafter, primarily portions that are different from those of the first exemplary embodiment are described in detail, and any remaining portion of the description thereof is given by way of reference to the proceeding description. In addition, in the third exemplary embodiment, for better comprehension and ease of description, the same (or substantially similar) elements are designated by the same reference numerals as the first exemplary embodiment.

Figure 4:
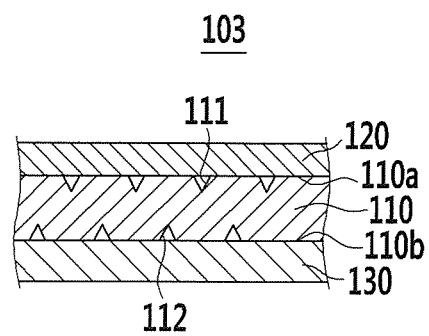
FIG. 4 is a cross-sectional view showing a polarization film according to a third exemplary embodiment.

FIG. 4 is a cross-sectional view showing a polarization film 103 according to a third exemplary embodiment of the present invention.

The polarizer 110 includes a first polarization groove 111 formed on the upper surface 110a of the polarizer 110 and a second polarization groove 112 formed on the lower surface 110b of the polarizer 110.

The second polarization groove 112 is recessed from the lower surface 110b of the polarizer 110 and extends in the first direction.

Figure 5:
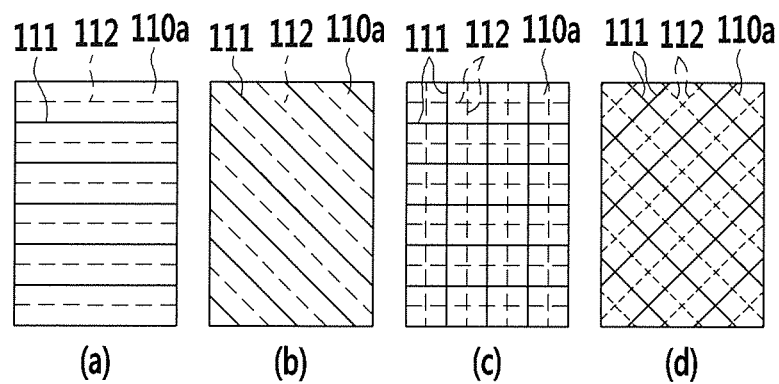
FIG. 5 is a top view of a polarizer shown in FIG. 4.

FIG. 5 is a top view of a polarizer shown in FIG. 4. FIGS. 5(a) to 5(d) each show various examples of configuring the first polarization groove 111 and the second polarization groove 112.

As shown in FIGS. 5(a) and 5(b), the first polarization groove 111 is recessed from the upper surface 110a of the polarizer 110 and extends in the first direction. The depth of the first polarization groove 111 may be from about 0.1 μm to about 10 mm, and the width of the first polarization groove 111 may be from about 0.1 μm to about 100 mm, but the depth and the width are not limited thereto.

In FIGS. 5(a) and (b), the second polarization groove 112 is recessed from the lower surface 110b of the polarizer 110 and also extends in the first direction. The depth of the second polarization groove 112 may be from about 0.1 μm to about 10 mm, and the width of the second polarization groove 112 may be from about 0.1 μm to about 100 mm, but the depth and the width are not limited thereto. Herein, the first direction refers to a direction (e.g., a predetermined direction) on the upper surface 110a and the lower surface 110b of the polarizer 110. The first direction may be a direction that is parallel to a polarization axis of the polarizer 110.

Further, as shown in FIGS. 5(c) and 5(d), the first polarization groove 111 may be recessed from the upper surface 110a of the polarizer 110 and also extend in the second direction crossing the first direction. That is, the first polarization groove 111 may be formed in a matrix form.

Also as shown in FIGS. 5(c) and 5(d), the second polarization groove 112 may be recessed from the lower surface 110b of the polarizer 110 and extend in the second direction crossing the first direction. That is, the second polarization groove 112 may be formed in a matrix form. Herein, the second direction refers to a direction (e.g., a predetermined direction) crossing the first direction on the upper surface 110a and the lower surface 110b of the polarizer 110.

The first polarization groove 111 may not overlap the second polarization groove 112 that is positioned in the same direction as the first polarization groove 111. For example, the second polarization groove 112 may be positioned at the lower surface 110b of the polarizer 110 corresponding to a portion between adjacent first polarization grooves 111.

The polarization film 103 according to the third exemplary embodiment may be manufactured by using a roll to roll process, and when the polarization film 103 is manufactured by using the roll to roll process, the first polarization groove 111 and the second polarization groove 112 may be formed on the polarizer 110 by using a cutter or a laser.

As described above, in the polarization film 103 according to the third exemplary embodiment, flexibility of the polarizer 110 is improved by including the first polarization groove 111 and the second polarization groove 112 extending in the first direction in the polarizer or by including the first polarization groove 111 and the second polarization groove 112 extending in the first direction and the second direction in the polarizer 110. Therefore, even though the first transparent support 120 and the second transparent support 130 are attached to the polarizer 110, flexibility of the entire polarization film 103 is improved to allow the polarization film 103 to be capable of being bended, folded, and rolled onto itself. That is, the polarization film 103 having improved flexibility is provided.

Hereinafter, a polarization film according to a fourth exemplary embodiment will be described referring to FIGS. 6 and 7.

Hereinafter, primarily portions that are different from those of the previously described exemplary embodiments are described in detail, and any remaining portion of the description thereof is given by way of reference to proceeding embodiments. In addition, in the fourth exemplary embodiment, for better comprehension and ease of description, the same (or substantially similar) elements are designated by the same reference numerals as the first exemplary embodiment.

Figure 6:
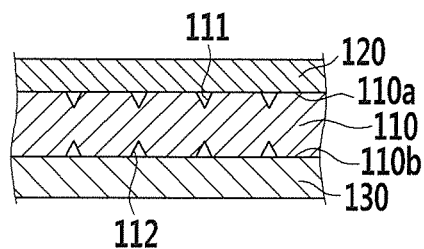
FIG. 6 is a cross-sectional view showing a polarization film according to a fourth exemplary embodiment.

FIG. 6 is a cross-sectional view showing a polarization film 104 according to a fourth exemplary embodiment of the present invention.

The polarizer 110 includes a first polarization groove 111 formed on the upper surface 110*a* of the polarizer 110 and a second polarization groove 112 formed on the lower surface 110*b* of the polarizer 110.

The second polarization groove 112 is recessed from the lower surface 110*b* of the polarizer 110 and extends in the first direction.

Figure 7:
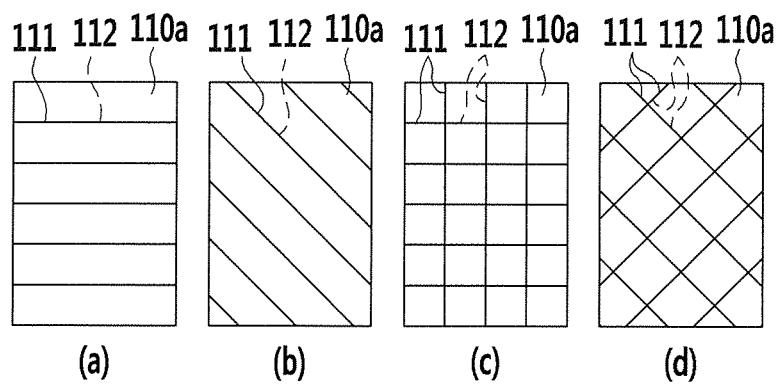
FIG. 7 is a top view of a polarizer shown in FIG. 6.

FIG. 7 is a top view of a polarizer shown in FIG. 6. FIGS. 7(*a*) to 7(*d*) each show various examples of configuring the first polarization groove 111 and the second polarization groove 112.

As shown in FIGS. 7(*a*) and 7(*b*), the first polarization groove 111 is recessed from the upper surface 110*a* of the polarizer 110 and extends in the first direction. The depth of the first polarization groove 111 may be from about 0.1 μm to about 10 mm, and the width of the first polarization groove 111 may be from about 0.1 μm to about 100 mm, but the depth and the width are not limited thereto.

Also as shown in FIGS. 7(*a*) and 7(*b*), the second polarization groove 112 is recessed from the lower surface 110*b* of the polarizer 110 and extends in the first direction. The depth of the second polarization groove 112 may be from about 0.1 μm to about 10 mm, and the width of the second polarization groove 112 may be from about 0.1 μm to about 100 mm, but the depth and the width are not limited thereto. Herein, the first direction refers to a direction (e.g., a predetermined direction) on the upper surface 110*a* and the lower surface 110*b* of the polarizer 110. The first direction may be a direction that is parallel to a polarization axis of the polarizer 110.

Further, as shown in FIGS. 7(*c*) and 7(*d*), the first polarization groove 111 may be recessed from the upper surface 110*a* of the polarizer 110 and also extend in the second direction crossing the first direction. That is, the first polarization groove 111 may be formed in a matrix form.

The second polarization groove 112 may be recessed from the lower surface 110*b* of the polarizer 110 and also extend in the second direction crossing the first direction. That is, the second polarization groove 112 may be formed in a matrix form. Herein, the second direction refers to a direction (e.g., a predetermined) direction crossing the first direction on the upper surface 110*a* and the lower surface 110*b* of the polarizer 110.

In FIG. 7, the first polarization groove 111 overlaps the second polarization groove 112. That is, the second polarization groove 112 is positioned on the lower surface of the polarizer 110 corresponding to the first polarization groove 111.

The polarization film 104 according to the fourth exemplary embodiment may be manufactured by using a roll to roll process, and when the polarization film 104 is manufactured by using the roll to roll process, the first polarization groove 111 and the second polarization groove 112 may be formed on the polarizer 110 by using a cutter or a laser.

As described above, in the polarization film 104 according to the fourth exemplary embodiment, flexibility of the polarizer 110 is improved by including the first polarization groove 111 and the second polarization groove 112 extending in the first direction in the polarizer 110 or by including the first polarization groove 111 and the second polarization groove 112 extending in the first direction and the second direction in the polarizer 110. Therefore, even though the first transparent support 120 and the second transparent support 130 are attached to the polarizer 110, flexibility of the entire polarization film 104 is improved to allow the polarization film 104 to be capable of being bended, folded, and rolled onto itself. That is, the polarization film 104 having improved flexibility is provided.

Hereinafter, a polarization film according to a fifth exemplary embodiment will be described referring to FIG. 8.

Hereinafter, primarily portions that are different from those of the previously described exemplary embodiments are described in detail, and any remaining portion of the description thereof is given by way of reference to proceeding embodiments. In addition, in the fifth exemplary embodiment, for better comprehension and ease of description, the same (or substantially similar) elements are designated by the same reference numerals as the first exemplary embodiment.

Figure 8:
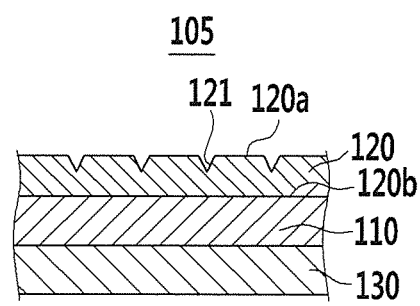
FIG. 8 is a cross-sectional view showing a polarization film according to a fifth exemplary embodiment.

FIG. 8 is a cross-sectional view showing a polarization film according to a fifth exemplary embodiment.

As shown in FIG. 8, in the polarization film 105 according to the fifth exemplary embodiment, the first transparent support 120 is attached to one surface of the polarizer 110, and the second transparent support 130 is attached to another surface of the polarizer 110.

The first transparent support 120 includes the first transparent groove 121 formed on the upper surface 120*a* of the first transparent support 120.

The first transparent groove 121 is recessed from the upper surface 120*a* of the first transparent support 120 and extends in the first direction.

The depth of the first transparent groove 121 may be from about 0.1 μm to about 10 mm, and the width of the first transparent groove 121 may be from about 0.1 μm to about 100 mm, but the depth and the width are not limited thereto. Herein, the first direction refers to a direction (e.g., a predetermined direction) on the upper surface 120*a* of the first transparent support 120. The first direction may be a direction that is parallel to a polarization axis of the polarizer 110.

The first transparent groove 121 may be recessed from the upper surface 120*a* of the first transparent support 120 and also extend in the second direction crossing the first direction. That is, the first transparent groove 121 may be formed in a matrix form. Herein, the second direction refers to a direction (e.g., a predetermined direction) crossing the first direction on the upper surface 120*a* of the first transparent support 120.

While, the first transparent groove 121 according to the fifth exemplary embodiment is illustrated having a V-shaped cross-section, the first transparent groove according to other exemplary embodiments is not limited thereto, and may have a circular, oval, or quadrangular cross-section.

The polarization film 105 according to the fifth exemplary embodiment may be manufactured by using a roll to roll process, and when the polarization film 105 is manufactured by using the roll to roll process, the first transparent groove 121 may be formed on the first transparent support 120 by using a cutter or a laser.

As described above, in the polarization film 105 according to the fifth exemplary embodiment, flexibility of the first transparent support 120 is improved by including the first transparent groove 121 extending in the first direction, or the first direction and the second direction, in the first transparent support 120. Therefore, even though the first transparent support 120 and the second transparent support 130 are attached to the polarizer 110, flexibility of the entire polarization film 105 is improved to allow the polarization film 105 to be capable of being bended, folded, and rolled onto itself. That is, the polarization film 105 having improved flexibility is provided.

Hereinafter, a polarization film according to a sixth exemplary embodiment will be described referring to FIG. 9.

Hereinafter, primarily portions that are different from those of the fifth exemplary embodiment are described in detail, and any remaining portion of description thereof is given by way of reference to proceeding embodiments. Further, in the sixth exemplary embodiment, for better comprehension and ease of description, the same (or substantially similar) elements are designated by the same reference numerals as the fifth exemplary embodiment.

Figure 9:
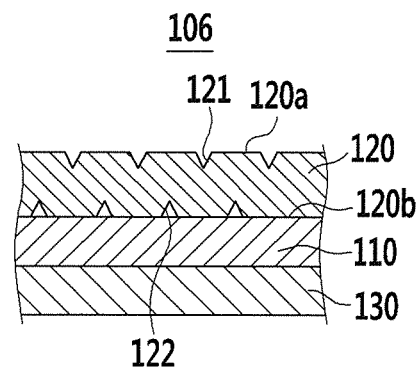
FIG. 9 is a cross-sectional view showing a polarization film according to a sixth exemplary embodiment.

FIG. 9 is a cross-sectional view showing a polarization film 106 according to a sixth exemplary embodiment of the present invention.

The first transparent support 120 includes the first transparent groove 121 formed on the upper surface 120a of the first transparent support 120 and the second transparent groove 122 formed on the lower surface 120b of the first transparent support 120.

The second transparent groove 122 is recessed from the lower surface 120b of the first transparent support 120 and extends in the first direction.

The first transparent groove 121 is recessed from the upper surface 120a of the first transparent support 120 and extends in the first direction. The depth of the first transparent groove 121 may be from about 0.1 µm to about 10 mm, and the width of the first transparent groove 121 may be from about 0.1 µm to about 100 mm, but the depth and the width are not limited thereto.

The second transparent groove 122 is recessed from the lower surface 120b of the first transparent support 120 and extends in the first direction. The depth of the second transparent groove 122 may be from about 0.1 µm to about 10 mm, and the width of the second transparent groove 122 may be from about 0.1 µm to about 100 mm, but the depth and the width are not limited thereto. Herein, the first direction refers to a direction (e.g., a predetermined) direction on the upper surface 120a and the lower surface 120b of the first transparent support 120. The first direction may be a direction that is parallel to a polarization axis of the polarizer 110.

Further, the first transparent groove 121 may be recessed from the upper surface 120a of the first transparent support 120 and also extend in the second direction crossing the first direction. That is, the first transparent groove 121 may be formed in a matrix form.

The second transparent groove 122 may be recessed from the lower surface 120b of the first transparent support 120 and may extend in the second direction crossing the first direction. That is, the second transparent groove 122 may be formed in a matrix form. Herein, the second direction refers to a direction (e.g., a predetermined direction) crossing the first direction on the upper surface 120a and the lower surface 120b of the first transparent support 120.

In FIG. 9, the first transparent groove 121 does not overlap the second transparent groove 122. That is, the second transparent groove 122 is positioned at the lower surface of the first transparent support 120 corresponding to a portion that is between adjacent first transparent grooves 121.

The polarization film 106 according to the sixth exemplary embodiment may be manufactured by using a roll to roll process, and when the polarization film 106 is manufactured by using the roll to roll process, the first transparent groove 121 and the second transparent groove 122 may be formed on the first transparent support 120 by using a cutter or a laser.

As described above, in the polarization film 106 according to the sixth exemplary embodiment, flexibility of the first transparent support 120 is improved by including the first transparent groove 121 and the second transparent groove 122 extending in the first direction in the first transparent support 120 or including the first transparent groove 121 and the second transparent groove 122 extending in the first direction and the second direction in the first transparent support 120. Therefore, even though the first transparent support 120 and the second transparent support 130 are attached to the polarizer 110, flexibility of the entire polarization film 106 is improved to allow the polarization film 106 to be capable of being bended, folded, and rolled onto itself. That is, the polarization film 106 having improved flexibility is provided.

Hereinafter, a polarization film according to a seventh exemplary embodiment will be described referring to FIG. 10.

Hereinafter, primarily portions that are different from those of the fifth exemplary embodiment are described in detail, and any remaining portion of description thereof is given by way of reference to the fifth exemplary embodiment. Further, in the seventh exemplary embodiment, for better comprehension and ease of description, the same (or substantially similar) elements are designated by the same reference numerals as the fifth exemplary embodiment.

Figure 10:
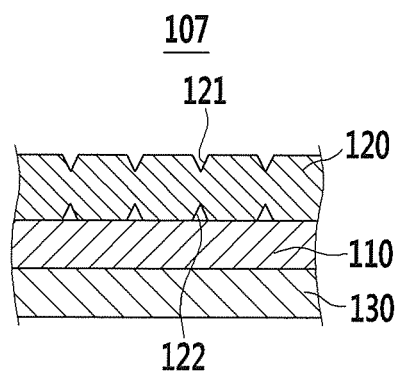
FIG. 10 is a cross-sectional view showing a polarization film according to a seventh exemplary embodiment.

FIG. 10 is a cross-sectional view showing a polarization film 107 according to a seventh exemplary embodiment.

The first transparent support 120 includes the first transparent groove 121 formed on the upper surface 120a of the first transparent support 120 and the second transparent groove 122 formed on the lower surface 120b of the first transparent support 120.

The first transparent groove 121 is recessed from the upper surface 120a of the first transparent support 120 and extends in the first direction. The depth of the first transparent groove 121 may be from about 0.1 µm to about 10 mm, and the width of the first transparent groove 121 may be from about 0.1 µm to about 100 mm, but the depth and the width are not limited thereto.

The second transparent groove 122 is recessed from the lower surface 120b of the first transparent support 120 and extends in the first direction. The depth of the second transparent groove 122 may be from about 0.1 µm to about 10 mm, and the width of the second transparent groove 122 may be from about 0.1 µm to about 100 mm, but the depth and the width are not limited thereto. Herein, the first direction refers to a direction (e.g., a predetermined direction) on the upper surface 120a and the lower surface 120b of the first transparent support 120. The first direction may be a direction that is parallel to a polarization axis of the polarizer 110.

Further, the first transparent groove 121 may be recessed from the upper surface 120a of the first transparent support 120 and also extend in the second direction crossing the first direction. That is, the first transparent groove 121 may be formed in a matrix form.

The second transparent groove 122 may be recessed from the lower surface 120b of the first transparent support 120 and also extend in the second direction crossing the first direction. That is, the second transparent groove 122 may be formed in a matrix form. Herein, the second direction refers to a direction (e.g., a predetermined direction) crossing the first direction on the upper surface 120a and the lower surface 120b of the first transparent support 120.

The first transparent groove 121 overlaps the second transparent groove 122. That is, the second transparent groove 122 is positioned on the lower surface of the first transparent support 120 corresponding to the first transparent groove 121.

The polarization film 107 according to the seventh exemplary embodiment may be manufactured by using a roll to roll process, and when the polarization film 107 is manufactured by using the roll to roll process, the first transparent groove 121 and the second transparent groove 122 may be formed on the first transparent support 120 by using a cutter or a laser.

As described above, in the polarization film 107 according to the seventh exemplary embodiment, flexibility of the first transparent support 120 is improved by including the first transparent groove 121 and the second transparent groove 122 extending in the first direction in the first transparent support 120 or by including the first transparent groove 121 and the second transparent groove 122 extending in the first direction and the second direction in the first transparent support 120. Therefore, even though the first transparent support 120 and the second transparent support 130 are attached to the polarizer 110, flexibility of the entire polarization film 107 is improved to allow the polarization film 107 to be capable of being bended, folded, and rolled onto itself. That is, the polarization film 107 having improved flexibility is provided.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. For example, in polarization films according to other exemplary embodiments of the present invention, the transparent groove may be formed on one or more of the upper surface and the lower surface of the second transparent support 130, or a groove may be formed on one or more of the upper surface and the lower surface of each of the polarizer 110, the first transparent support 120, and the second transparent support 130.

What is claimed is:

1. A polarization film comprising:
   a polarizer consisting of a single layer configured to polarize incident light in a polarization direction, the polarizer having a plurality of first polarization grooves, a plurality of second polarization grooves, a plurality of another first polarization grooves, and a plurality of another second polarization grooves,
   wherein the first and the another first polarization grooves are recessed from an upper surface of the polarizer, the first and the another first polarization grooves extending in a first direction and a second direction, respectively, such that a thickness of the polarizer is reduced at the plurality of the first and the another first polarization grooves, wherein at least one of the first polarization grooves intersects at least one of the another first polarization grooves, and
   wherein the second and the another second polarization grooves are recessed from a lower surface of the polarizer, the second and the another second polarization grooves extending in the first direction and the second direction, respectively, such that a thickness of the polarizer is reduced at the plurality of the second and the another second polarization grooves, wherein at least one of the second polarization grooves intersects at least one of the another second polarization grooves;
   a first transparent support at the upper surface of the polarizer, the first transparent support having a planar shape and having a lowermost portion that is above an uppermost portion of the polarizer; and
   a second transparent support at the lower surface of the polarizer, the second transparent support having a planar shape and having an uppermost portion that is below a lowermost portion of the polarizer,
   wherein a portion of the upper surface of the polarizer is flat between the first polarization grooves, and
   a portion of the lower surface of the polarizer is flat between the second polarization grooves.

2. The polarization film of claim 1, wherein: one of the second polarization grooves does not overlap any portion of one of the first polarization grooves.

3. The polarization film of claim 1, wherein: one of the second polarization grooves at least partially overlaps one of the first polarization grooves.

4. The polarization film of claim 1, wherein:
   the polarizer comprises polyvinyl alcohol (PVA).

5. The polarization film of claim 1, wherein:
   at least one of the first transparent support or the second transparent support comprise triacetyl cellulose (TAC).

6. A display device comprising:
   a display panel configured to display an image; and
   a polarization film on the display panel comprising:
   a polarizer consisting of a single layer configured to polarize incident light in a polarization direction, the polarizer having a plurality of first polarization grooves, a plurality of second polarization grooves, a plurality of another first polarization grooves, and a plurality of another second polarization grooves,
   wherein the first and the another first polarization grooves are recessed from an upper surface of the polarizer, the first and the another first polarization grooves extending in a first direction and a second direction, respectively, such that a thickness of the polarizer is reduced at the plurality of the first and the another first polarization grooves, wherein at least one of the first polarization grooves intersects at least one of the another first polarization grooves, and
   wherein the second and the another second polarization grooves are recessed from a lower surface of the polarizer, the second and the another second polarization grooves extending in the first direction and the second direction, respectively, such that a thickness of the polarizer is reduced at the plurality of the second and the another second polarization grooves, wherein at least one of the second polarization grooves intersects at least one of the another second polarization grooves;
   a first transparent support at the upper surface of the polarizer, the first transparent support having a planar shape and having a lowermost portion that is above an uppermost portion of the polarizer; and
   a second transparent support at the lower surface of the polarizer, the second transparent support having a planar shape and having an uppermost portion that is below a lowermost portion of the polarizer,
   wherein a portion of the upper surface of the polarizer is flat between the first polarization grooves, and
   a portion of the lower surface of the polarizer is flat between the second polarization grooves.

* * * * *